June 20, 1944. T. S. BINDSCHEDLER ET AL 2,351,595
MAGNETIC TESTING DEVICE
Filed May 23, 1940 2 Sheets-Sheet 2
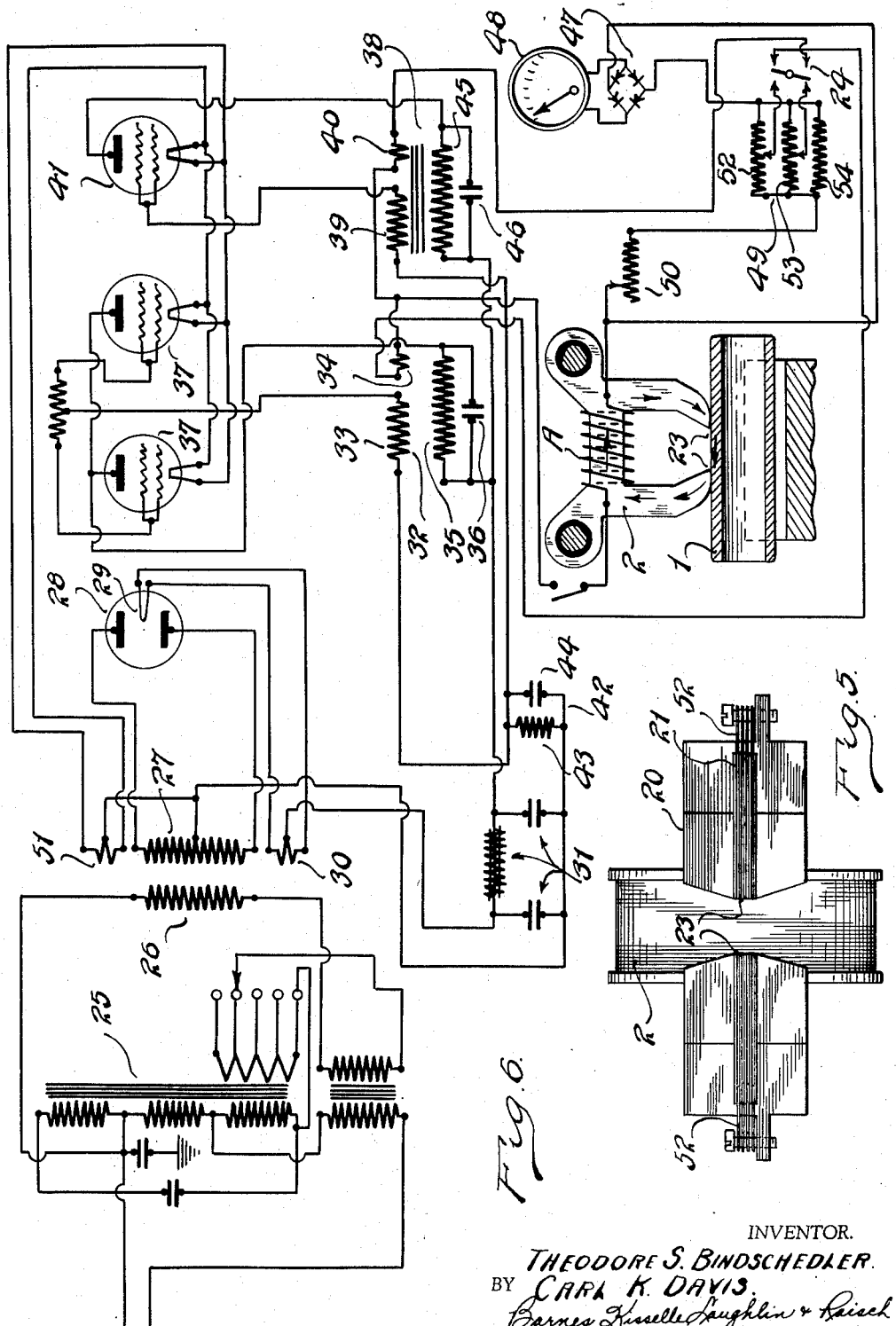
INVENTOR.
THEODORE S. BINDSCHEDLER.
BY CARL K. DAVIS.
Barnes, Kisselle, Laughlin & Raisch
ATTORNEYS.

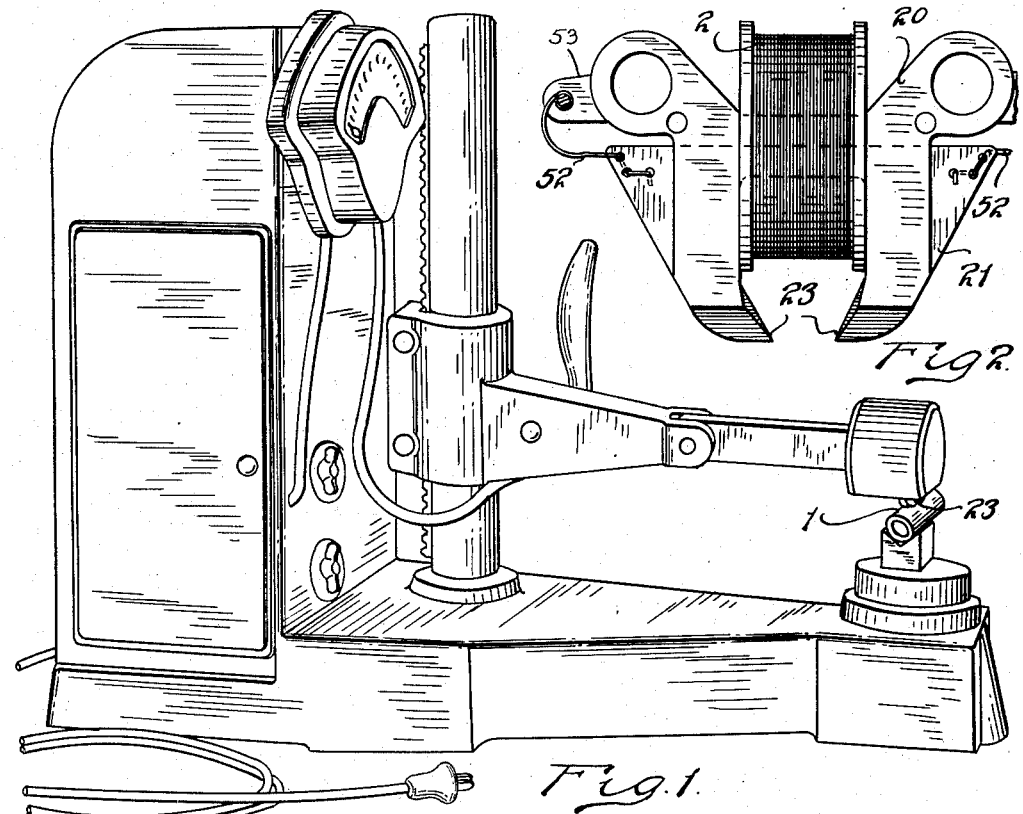
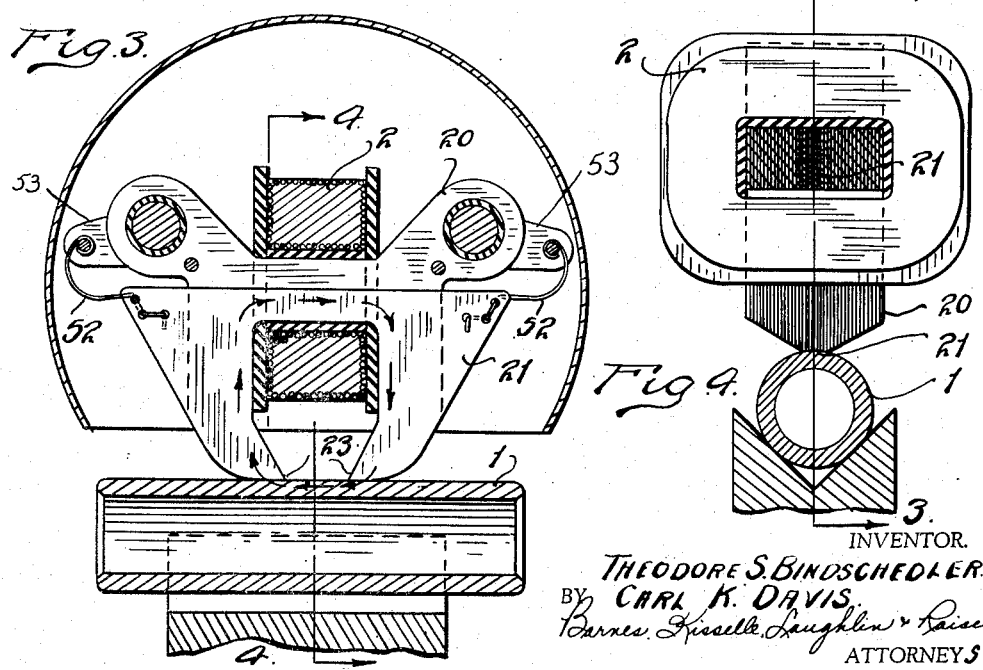

Patented June 20, 1944

2,351,595

UNITED STATES PATENT OFFICE 2,351,595

MAGNETIC TESTING DEVICE

Theodore S. Bindschedler, Grosse Pointe, and Carl K. Davis, Mount Clemens, Mich., assignors, by mesne assignments, to Magnetic Products Corporation, Detroit, Mich., a corporation of Michigan Application May 23, 1940, Serial No. 336,694

8 Claims. (Cl. 175—183)

This invention relates to novel and practical means for determining the properties of materials possessing magnetic properties and particularly ferrous materials.

At the present time, the equipment available commercially for the testing of hardness employs physical tests which are either the indentation or scratch method. This mars the surface of the piece being tested and is, therefore, a destructive test and only sample pieces may be tested. In addition, it is slow and laborious. The only known method today of checking the depth of hardness and the hardness of carburized or cyanided parts must be done in a laboratory and requires the cutting, polishing, etching, and the measuring under a microscope of the test piece. While it is recognized by the applicants that it is not broadly new to use magnetic properties of a material as an indication of its physical properties, it is believed that the device herein to be described has advantages over any known method. Patent No. 1,428,833 to Theodore S. Bindschedler describes a device which measures the amount of flux passing through a test piece. The present invention measures the current which passes through the coil of the testing electro-magnet. This current varies with the flux passing through the test piece and thus the magnetic effect of the tested piece acts as a choke valve on the current supplied.

It is, in addition, recognized that there are other electro-magnetic testing devices known. Two advantages of applicants' device over the prior art are the ability to test a limited or desired predetermined area and to measure depth of case hardening. The test of a limited area may be called a spot test and is very important for it permits the location of defects in any particular area. The prior machines merely gave a reading of the average condition of the whole test piece and could not locate defects in or apprise one of the properties of any given or limited area of the material tested. It is not believed that any prior machine can measure depth of case.

It is an object of this invention to provide a means which will permit a complete inspection of all heat treated parts before assembly in a finished product. A further object of the invention is to provide a means of testing a limited area on the object to be tested. Another object of the invention is to provide a means for measuring the depth of case. A further object is to provide a means of measuring conditions on the surface or skin of the test piece. A further object is to provide a means of checking all changes in grain sizes or grain structure due to heat treatment of ferrous alloys. A further object is to provide a means of locating stresses. Another object is to provide a means of measuring the thickness of electro-plating, paint, lacquer, enamel or similar coatings. A further object is to provide a means for testing surface conditions of parts after grinding, drawing, or cold working. Another object is to provide a device which will permit tests at varying but controllable depths from the surface of the tested piece. A further object is to provide a means for making such inspections which will not mar or deface the inspected part. A further object of the invention is to provide a means to accomplish these results that is both speedy and economical. Another object of the invention is to provide a means of securing a more perfect magnetic contact on the test piece. Other objects and advantages of our invention will be apparent from the following description and drawings.

In the drawings:

Fig. 1 is a perspective view of the complete device.

Fig. 2 is a vertical view of the electro-magnet and contact member.

Fig. 3 is a vertical section through the electro-magnet contact member and test piece on the line 3—3 of Fig. 4.

Fig. 4 is a vertical section on the line 4—4 of Fig. 3.

Fig. 5 is a bottom view of the contact member and electro-magnet.

Fig. 6 is a circuit diagram of the oscillator and accompanying parts.

Our invention is adapted to permit the placing of the test piece 1, illustrated as a small object of ferrous material, in an air gap provided in the laminated iron core of a testing unit assembly and by means of firm contact thereon to make it actually a part of the electro-magnetic circuit. When the proper alternating current is applied to the exciting coil 2, an alternating flux will flow in the test piece. This flux will be dependent upon the reluctance of the magnetic path of which the test piece is now an integral part. The resultant flux will induce a back E. M. F. into the exciting coil. This back E. M. F. will cause a variation of current in the test circuit since a steady alternating potential is applied to the unit. The current in the coil is measured. Comparison of the current now passing through the coil is made with that which passed through when an object of known properties had previously been placed therein. Thus, an object of known properties is used as a standard of measurement to permit the interpretation of electrical readings to measurements of physical and chemical properties and heat treatment. The test piece should be compared to an object of known properties which has had a treatment of a similar nature. Thus, for example, a cyanided test piece should be compared with another cyanided object and a cold worked test piece should be compared with a cold worked standard.

A uniform contact between the test piece and the pole tips of the testing unit assembly is essential for accurate results. Poor contact has the effect of adding reluctance in the magnetic path and would result in inaccurate readings. To provide the proper contact referred to, the core of the exciting coil is designed as shown in Figs. 2, 3, 4 and 5. One aim of this construction is to provide flexible pole pieces. The core of the exciting coil is composed of laminations of a magnetic material, preferably of a soft iron and the core has a base portion and a pair of legs curved toward each other. These laminations may be divided into several groups. Those referenced 20 in Fig. 3 are substantially the shape of the letter C rotated so that the open face points downward. These laminations 20 form the "backbone" of the exciting coil. A plurality of other laminations 21, in Fig. 3, take the form shown therein and have projections which extend beyond the side of the main laminations. Spring pressure is applied to the laminations 21 by springs 52 to provide a flexibility at the contact points of the solenoid. A pair of springs 52 is provided for each yieldable lamination 21. One end of each spring 52 is mounted on a support 53 fixed to a lamination 20 and the other end is secured to a lamination 21 so that the springs 52 urge the laminations 21 downwardly as viewed in Fig. 3. The spring actuated laminations should project slightly beyond the others at the point of contact to obtain a better contact with the metal piece being examined. Additional small laminations may be placed above the spring actuated laminations 21 and within the C-shaped laminations to complete the core. The particular shape of the contact points of the testing exciting coil is of great importance. As illustrated in Figs. 2 and 3, the points toe inward as at 23 and the air gap at their end is smaller than the air gap nearer the coil. The core is so shaped to prevent inaccuracy resulting from magnetic flux jumping the air gap rather than passing through the test piece. By bringing these contact points closer together, the path of flux through the test piece is more permeable than any path through the air which flux might take. In addition, as illustrated in Fig. 4, the area of contact is substantially narrower than the core itself. This is a result of longitudinally narrowing the core at its lower end. This restricted contact area reduces to a minimum any inaccuracies that might result from irregularities on the surface of the test piece.

The coil 2 preferably circumscribes most of the base portion of the core and a minimum of surface of the core is exposed to the air. The ends of the base portion of the core are preferably provided with rounded surfaces. This is to the end that loss of magnetism to the air will be minimized. It has been found that with the ends 23 of the core in close proximity and with the coil 2 upon the base portion of the core rather than the legs of the core that the leakage of magnetic flux into the work piece is controlled. Surface readings are facilitated by this controlled leakage as the flux is not forced to depths in the material to be tested.

It should be noted that our device provides a spot test of the material examined. The results of the test are a function of the characteristics of the material placed between the ends 23 of the core. The ends 23 of the core are, as illustrated, separated by only a small distance. Therefore the test is over but a small area. Heretofore, magnetic testing devices have given a test which is a function of the average permeability of the piece. Such a test is unsatisfactory as it is misleading for the average may be satisfactory even though one or more weak spots are present. In addition, the spot test permits the operator to determine the location of any defect.

The character of the current supplied to the coil of the test unit is very important. By properly choosing the current, different desirable results may be obtained. If an alternating current of high frequency is used, the magnetism will only penetrate the surface of the test piece. Where the magnetic flux penetrates only the surface of the test piece, obviously the influence on the coil current will be a function of the magnetic properties of the surface of the object. High frequency currents are, therefore, very desirable. When a low frequency current is used, the penetration will be deeper. Thus, with a low frequency current, it is possible to obtain a conglomerate test from the surface to the interior of the test piece. The terms "high" and "low" frequency current as used in this description will be explained not by way of limitation but by way of example. It has been found that with the use of current of about four thousand cycles the penetration will be to a depth of about one or two thousandths of an inch. With the use of a current of about four hundred cycles, the penetration will be about $\frac{1}{16}$ to $\frac{1}{8}$ of an inch. A sixty cycle current will penetrate to a depth of about $\frac{1}{2}$ an inch. A current above twelve thousand cycles will only penetrate about .0005 of an inch. Frequencies above this amount are not necessary for the presently known uses of the instant method and apparatus. It has been found desirable to provide optional choices of currents in this device to permit variations in the depth of the test. To this end, by the operation of a switch 24, a high frequency current may be sent through the coil of the solenoid or a low frequency current may be chosen. There is thus provided a test for the surface peculiarities of a test piece. In addition means for determining the effect of heat treatments and other physical and chemical properties of the test piece which are present at considerable depths within it is provided by the low frequency current. It should be noted that the characteristics which can be measured by our device are numerous. Any characteristic which affects the permeability of the test piece is a proper subject of measurement. Therefore, the device may be used for measuring depth of case hardening as well as measuring the effects of heat treatment, cold working and numerous other physical and chemical properties of the object.

The apparatus, designed to produce the high and low frequency current suitable for testing, comprises basically two oscillating circuits fed and controlled by vacuum tubes. It is to be understood, however, that one or a plurality of oscillating circuits may be used, but it is our preference to use two. Referring to Fig. 6 of the drawings, this means of producing the desired current will be described in detail. A constant voltage is essential to accurate operation of the device. In order to obtain a constant voltage on the input line, a suitable voltage stabilizer 25, such as a Raytheon voltage stabilizer, is interposed at the inlet. This Raytheon voltage stabilizer is known in the art. It consists of two transformers with the primaries in series. One of these transformers operates at a high magnetic density and is resonated by means of a condenser. The secondaries of these two transformers are connected in series opposed. It is not, however, believed necessary to go into a detailed description as this device is well known.

The output terminals from the line voltage stabilizer feed directly into the primary winding 26 of a power transformer. This power transformer is designed to furnish current to supply the tube filaments and plates of vacuum tubes hereinafter to be described. A secondary coil 27 furnishes high voltage alternating current to a full wave rectifier 28, preferably of type 83, which converts the high voltage alternating current to a pulsating direct current. Filament 29 of this rectifier is fed by a low voltage secondary coil 30. A low pass filter designated as 31 removes the greater portion of the remaining alternating current present and the balance of direct current becomes the plate voltage supply of the oscillator tubes. In addition, a separate low voltage secondary coil 51 supplies the filaments of the oscillator tubes. These circuits may be seen in Fig. 6.

The high frequency oscillatory circuit contains a transformer with an air inductance generally designated as 32. This high frequency transformer has three separate windings 33, 34 and 35. Winding 35 is tuned by a condenser 36 to the proper frequency. Winding 33 excites and controls the grid of the vacuum tube or tubes 37, to be hereinafter referred to, and winding 34 comprises the output coil which supplies power to the test unit assembly. An air inductance is used in the high frequency circuit because the air inductance is independent of saturation, maintains a constant frequency and keeps the losses as low as possible.

The low frequency oscillatory circuit contains a transformer with a laminated iron core inductance generally designated as 38. This low frequency transformer is similar in operation to the high frequency air inductance transformer and differs only in the addition of the iron core.

The secondary windings which control the grids on the high and low frequency oscillators are designated 33 and 39 respectively. The secondary output windings which supply high and low frequency power to the test unit assembly are designated 34 and 40.

Both oscillatory circuits are controlled by vacuum tubes preferably of type 46. In the accompanying drawings, the vacuum tubes in the high frequency circuit are designated 37 and the vacuum tube in the low frequency circuit is designated 41. A common grid bias 42, comprising a resistance 43 and a condenser 44 in parallel, maintains all oscillator grids with a continuing negative charge.

To further describe the operation of an oscillator, reference will be had to the low frequency circuit containing the iron core and controlled by the vacuum tube 41. Plate circuit coil 45 is tuned to the required resonance by condenser 46.

The phase of the grid coil 39 and the magnitude of the voltage induced in it by any oscillatory disturbance is such that it will cause the grid of the vacuum tube to sustain oscillation. The theory of this use of a vacuum tube as an oscillator is not new and is known to those skilled in the art and, therefore, a more detailed description is not believed necessary. By means of a switching arrangement generally designated as 24, a test coil A may be placed in the high or low frequency circuit as desired. Final readings are obtained on a D. C. milliammeter 48 which is preferably used in conjunction with a full wave rectifier 47 and a combination shunt consisting of a variable resistance 50 in series with a group resistance 49. It is to be understood, however, that a half wave (instead of a full wave) rectifier could be used in conjunction with an ammeter of greater sensitivity. A full wave rectifier is, however, preferred. The group resistance 49 illustrated consists of two potentiometers and a fixed ballast resistance all in parallel. The controls of the potentiometers are available to the operator for adjusting calibration on both frequencies independently. Rheostat 50 calibrates both frequencies simultaneously. This adjustment is not available to the operator. The function to be performed by the variable resistances is to permit the operator to standardize the scale reading on the milliammeter 48 to desired hardness readings. For example, assume a surface test is to be taken and the high frequency coil 34 is to be connected to the test coil and it is desired to have the numeral 100 on the milliammeter dial correspond to the reading on a sample material of known hardness. This sample may be contacted by points 23 of the exciting coil 2 and the variable resistance 53 adjusted until the milliammeter reads 100. Other surface tests may then be correlated to the 100 reading of the sample piece. For depth readings on the low frequency coil 40 a similar procedure is followed except that the variable resistance 52 is adjusted. The standardization by means of the variable resistances permits the operator to so adjust the high and low frequency circuits that a particular reading on the milliammeter will designate the same hardness for either surface or depth tests. The milliammeter is then standardized to read on the scales desired automatically when switch 24 is operated to cut in either the high or low frequency circuit as desired. It is therefore apparent that the milliammeter 48 may be independently adjusted for either frequency. It is to be understood that these independent adjustments for different circuits could be multiplied as desired if more than two circuits were used by the addition of the desired number of variable resistances connected in parallel with variable resistances 52 and 53. The operator may then adjust the variable resistances to give the desired readings independently for each circuit. The rheostat 50 is in series with the group resistance 49 and one adjustment of rheostat 50 adjusts the reading of the milliammeter for all circuits simultaneously. This rheostat 50 is primarily incorporated for factory adjustment during assembly of the device and preferably is not accessible to the operator. The ballast resistance is installed in parallel with the variable resistances 52 and 53 to permit a more delicate selection of the resistance of resistances 52 and 53 than is ordinarily obtainable commercially. That is, where it is difficult to commercially obtain a variable resistance of the desired number of ohms, this may easily be compensated for by a ballast resistance 54. A D. C. instrument is used because of its evenly divided linear scale which corresponds proportionally to the hardness readings of both surface and depth tests.

Several important features of the arrangement just described should be noted. Testing unit coil A has been coupled directly into the oscillator circuit. This is important since the test coil becomes an integral part of the oscillatory circuit and its voltage regulation is partially compensated for by the vacuum tube. Under various sample tests, the test coil assumes varying values of impedance. It is essential that the voltage across the test coil be the same under all conditions. By coupling this varying load directly into the oscillatory circuit, this is accomplished. Under operating conditions, the test coil is coupled into the oscillatory circuit only momentarily. This means that the resonant frequency varies as the test coil is applied and varies in addition according to the impedance of the test coil at the time. Thus, we have designed our oscillatory circuits so that L/C (inductance divided by capacity) is a minimum for any given tube combination. This gives the effect of a minimum frequency change during operation and gives the best possible voltage regulation.

In the operation of our device, a standard calibration sample has its physical or chemical properties or characteristics caused by heat treatment determined by regular laboratory methods. This standard piece is then tested by our device and the milliammeter readings obtained from it will form a basis for converting subsequent milliammeter readings to known physical, chemical or heat treatment properties by means of comparison. Objects to be tested are then placed in the air gap of the testing coil and an alternating current is passed through this coil by means of the circuits herein described. Variations in this current will be caused by differences in physical, chemical or heat treatment properties of test pieces and these variations are measured on a milliammeter. The milliammeter readings are compared with the reading on the test piece of known properties. By operation of a switch 24, the alternating current passing through the testing coil may be of either high or low frequency as desired. The high frequency current will test surface peculiarities of the test piece. A low frequency current will give a conglommerate test from the surface to the interior of the metal.

We claim:

1. An electro-magnetic testing device for testing the surface properties of magnetic materials adapted to operate on alternating current of high frequencies, said device comprising a full wave rectifier, a filter operatively connected to said full wave rectifier, a plurality of oscillating vacuum tube circuits adapted to be fed from said filter, each of said circuits containing a vacuum tube and an inductance, an exciting coil, a core in said coil adapted to contact the material to be tested, a switch means adapted to connect said exciting coil to any of said circuits, a rectifier adapted to convert the alternating current in said exciting coil to direct current and a direct current measuring instrument.

2. An electro-magnetic testing device for testing the physical, chemical or heat treatment properties of magnetic materials, an electro-magnet in said device, a laminated core in said electro-magnet adapted to contact the material to be tested, laminations in said core having substantially an arcuate shape, laminations in said core spaced between said arcuated laminations and having ends taking substantially the position of the ends of the said arcuate laminations, a coil in said electro-magnet wound around a portion of the body of all said laminations, the second mentioned laminations being adapted to project beyond the sides of the other laminations, spring means on the projecting part of said laminations adapted to urge the second mentioned laminations to project slightly beyond the other laminations at the portions of said core adapted to contact the material to be tested.

3. In an electro-magnetic testing device for testing the physical, chemical or heat treatment properties of the surface of magnetic materials, a core of high permeability, said core comprising a base portion and a pair of legs extending from said base portion, said legs being curved and tapered toward each other whereby their free ends are in proximity and adapted to contact material to be tested, an exciting coil circumscribing said base in such manner as to expose a minimum of said base surface to the air, said surface being rounded and a source of supply of high frequency alternating electric current connected to said coil.

4. In a device for testing the physical, chemical or heat treatment properties of magnetic materials, a plurality of sources of electric current, an exciting coil adapted to be fed from said sources and adapted to create an electro-magnetic circuit, means to make the material to be tested a part of the electro-magnetic circuit, a switch adapted to selectively connect said coil to any of said current sources, a measuring instrument adapted to measure the current in said exciting coil, and a variable resistance in each circuit adapted to control the readings of the measuring instrument.

5. The method of determining the characteristics of a ferrous material comprising, placing the material in the air gap of the core of an exciting coil, providing a plurality of circuits of alternating electric current of different frequencies and a measuring instrument adapted to measure the amount of current passing through said exciting coil, individually controlling the resistance of each of said circuits and selectively connecting the exciting coil and measuring instrument into said circuits whereby the readings of the measuring instrument may be calibrated as desired for each circuit by the control of the resistance in individual circuits.

6. In a device for testing the physical, chemical or heat treatment properties of magnetic materials, a plurality of sources of electric current, an exciting coil adapted to be fed from said sources and adapted to create an electro-magnetic circuit, means to make the material to be tested a part of the electro-magnetic circuit, means to selectively connect said coil to any of said current sources, a measuring instrument adapted to measure the current in said exciting coil, a group resistance comprising a plurality of variable resistances each of said variable resistances being connected to one of said current sources and a variable rheostat in series with said group resistance whereby the readings of the measuring instrument may be independently controlled for individual circuits by the variable resistances and controlled for all circuits simultaneously by the variable rheostat.

7. The method of co-relating the readings of a measuring instrument in an electro-magnetic testing device provided with a plurality of electric circuits, an exciting coil and a selective means to connect said exciting coil to said circuits to a desired hardness standard by individually varying the resistance of said circuits whereby the measuring instrument will read according to the desired hardness standard when each circuit is connected to the exciting coil.

8. An electro-magnetic testing device for making spot tests of the surface characteristics of magnetic objects comprising an exciting coil, a core in said coil adapted to contact at two points the object to be tested, said core having portions adjacent said points which are inclined and directed toward each other, said portions of said core being tapered and having their smallest area at their contact points whereby the magnetic flux is concentrated and directed over the surface of the object to be tested, a source of high frequency alternating current connected to said coil, measuring means to measure the current passing through said coil and means to move said core out of contact with one object and into contact with another object.

THEODORE S. BINDSCHEDLER.
CARL K. DAVIS.